Sept. 19, 1950   J. S. CLARKE ET AL   2,523,194
GASEOUS FUEL BURNER
Filed March 21, 1949
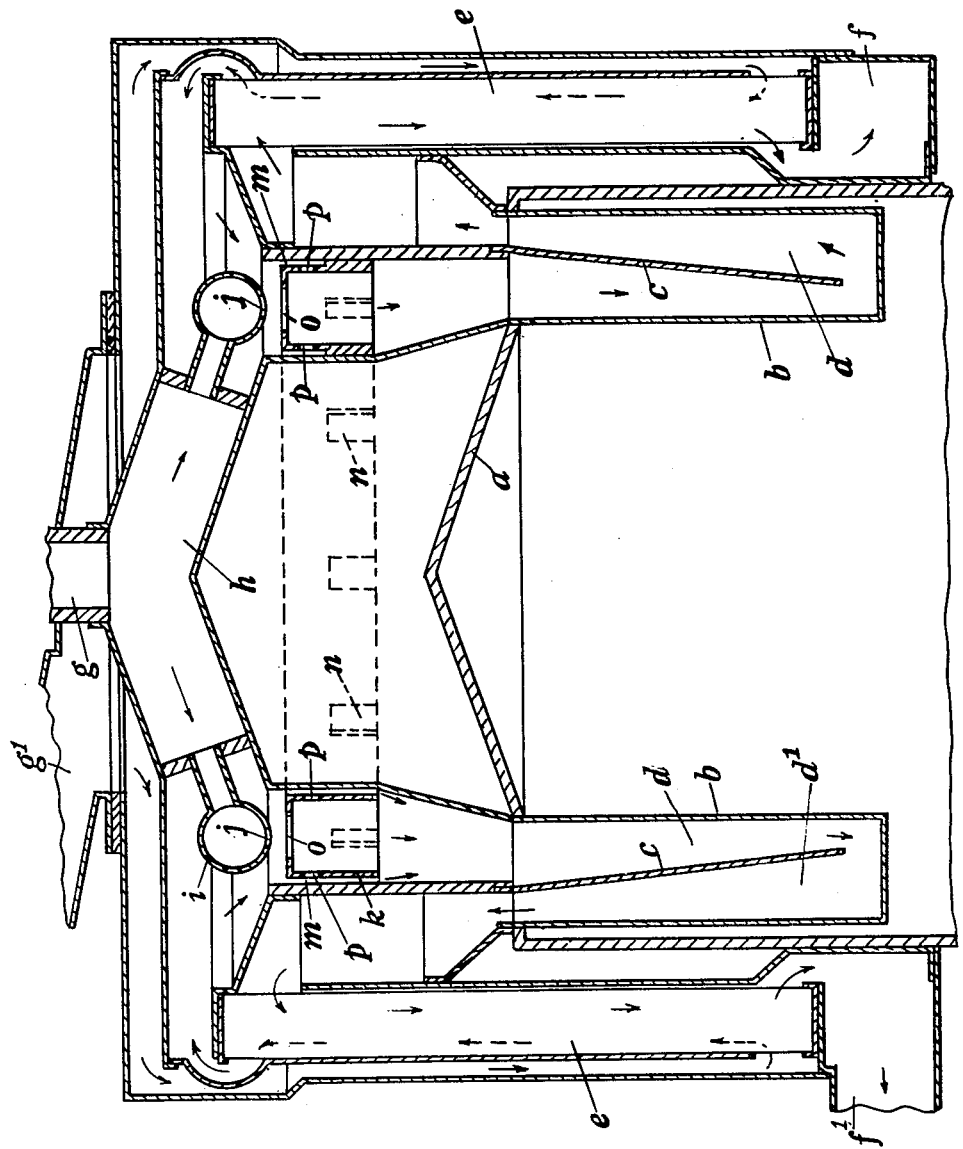
Inventors
J. S. Clarke
A. E. Clarke
N. P. Coupe
By [signature] Attys.

Patented Sept. 19, 1950

2,523,194

UNITED STATES PATENT OFFICE 2,523,194

GASEOUS FUEL BURNER

John Stanley Clarke, Burnley, Albert Edward Clarke, Brierfield, Burnley, and Noel Parker Coupe, Burnley, England, assignors to Joseph Lucas Limited, Birmingham, England Application March 21, 1949, Serial No. 82,604
In Great Britain March 25, 1948

1 Claim. (Cl. 158—7)

This invention relates to gas burners (and particularly burners for use with hot-air engines), of the kind in which a combustible mixture of air and gaseous or liquid-fuel is supplied to an annular combustion chamber by an annular duct having outlet orifices adjacent to the said chamber. The object of the invention is to provide in the combustion chamber improved turbulating means for effecting satisfactory admixture and regulation of additional air admitted to the region of combustion.

The invention comprises the combination with the combustion chamber, of a turbulating ring of channel section, and having orifices in its closed end opposite and adjacent to those in the annular duct which conveys the combustible mixture, additional air orifices being formed in the sides of the turbulating ring, and the latter being also adapted to form with the sides of the combustion chamber passages for the flow of air to the open end of the ring.

The accompanying drawing is a sectional side elevation illustrating one embodiment of the invention for use with a hot air engine.

Referring to the drawing, $a$ indicates a part of the cylinder of the engine. Into this extends an annular combustion chamber $b$ which is divided by an annular partition $c$. The gaseous or vapourised fuel, with some air, enters at $g$ into a chamber $h$, and thence passes to an annular duct $i$ having outlet orifices $j$ opposite the adjacent end of the combustion chamber. The hot gases issuing from the orifices $j$ enter the open upper end of the combustion chamber $b$, and flow down the region $d$ at one side of the partition $c$ and up the region $d^1$ at the other side of the partition, before flowing downwardly through the preheaters $e$ to a discharge outlet $f$. At the same time additional air for admixture with the hot gases is supplied to an inlet $g^1$ and flows down the outer side of, and upwardly through, the preheaters $e$ before entering the upper end of the combustion chamber $b$.

According to the invention, there is mounted in the combustion chamber and adjacent to the said duct $i$, a turbulating ring $k$ of inverted channel section. This ring is shaped to provide annular spaces $m$ between it and the inner surfaces of the combustion chamber. Also it has formed on it distance pieces $n$ which provide passages through which air can flow to the open lower end of the ring. In the upper end of the ring are formed orifices $o$ situated opposite the orifices $j$ in the duct $i$, and lateral orifices $p$. Air from the preheater can enter the turbulating ring with the gases from the duct $i$ through the orifices $o$. Also it can flow into the spaces $m$ and thence between the distance pieces $n$ to the lower end of the turbulating ring. Further air can enter the said ring from the spaces $m$ through the orifiices $p$.

By the use of a turbulating ring as above described we are able to ensure effective mixing of the additional preheated air with the combustible mixture, and also prevent overheating of the walls of the combustion chamber adjacent to the region of combustion. Further by the use of a turbulating ring as above described improved flame stability is obtained.

Having thus described our invention, what we claim as new and desire to secure by Letters Patent is:

A gas burner comprising in combination an annular combustion chamber having an open end, an annular duct arranged adjacent to the open end of said combustion chamber and having outlet orifices through which a gaseous mixture of air and fuel supplied to said duct can flow into said combustion chamber, a turbulating ring of channel section situated in the open end of said combustion chamber with the closed end of said ring adjacent to said annular duct, and with the sides of said ring spaced from the corresponding sides of said combustion chamber to form passages for the flow of air past the sides of said ring into said combustion chamber, the closed end of said ring being formed at positions opposite to the outlet orifices in said duct with orifices through which air and the gaseous mixture from said outlet orifices can flow, and the sides of said ring being formed with additional orifices through which air from said passages can flow.

JOHN STANLEY CLARKE.
ALBERT EDWARD CLARKE.
NOEL PARKER COUPE.

REFERENCES CITED

The following references are of record in the file of this patent:

UNITED STATES PATENTS

| Number | Name | Date |
|---|---|---|
| 697,768 | Woodward | Apr. 15, 1902 |
| 1,510,039 | Canfield | Sept. 30, 1924 |
| 1,596,609 | Gault | Aug. 17, 1926 |
| 2,167,183 | Naab et al. | July 25, 1939 |